(12) United States Patent
Brignac et al.

(10) Patent No.: US 7,694,564 B2
(45) Date of Patent: Apr. 13, 2010

(54) BOILER TUBE INSPECTION PROBE WITH CENTERING MECHANISM AND METHOD OF OPERATING THE SAME

(75) Inventors: Jacques L. Brignac, Simsbury, CT (US); Roland R. Moser, Zurich (CH)

(73) Assignee: ALSTOM Technology Ltd. (CH)

( * ) Notice: Subject to any disclaimer, the term of this patent is extended or adjusted under 35 U.S.C. 154(b) by 291 days.

(21) Appl. No.: 11/751,057

(22) Filed: May 21, 2007

(65) Prior Publication Data
US 2008/0289421 A1 Nov. 27, 2008

(51) Int. Cl.
*G01N 9/24* (2006.01)
*G01D 21/00* (2006.01)
*E21B 17/10* (2006.01)

(52) U.S. Cl. .................. 73/596; 73/622; 73/635; 73/866.5; 166/241.1

(58) Field of Classification Search .............. 73/596, 73/628, 641, 623, 633, 634, 638, 644, 622, 73/635, 866.5; 33/544.3; 324/220, 262; 376/245; 166/241.1, 241.3
See application file for complete search history.

(56) References Cited

U.S. PATENT DOCUMENTS

| | | | |
|---|---|---|---|
| 2,742,259 A | | 4/1956 | Boucher |
| 3,263,487 A | * | 8/1966 | Fiske, Jr. ..................... 374/16 |
| 4,006,359 A | | 2/1977 | Sullins et al. |
| 4,160,386 A | * | 7/1979 | Jackson et al. ............... 73/625 |
| 4,189,944 A | * | 2/1980 | Day et al. ..................... 73/623 |
| 4,843,896 A | * | 7/1989 | Napeloni et al. ............ 73/866.5 |
| 5,090,259 A | * | 2/1992 | Shishido et al. ............ 73/866.5 |
| 5,204,622 A | * | 4/1993 | McCaslin et al. ............ 324/220 |
| 5,359,898 A | | 11/1994 | Latimer |
| 5,453,688 A | * | 9/1995 | Cecco et al. ................ 324/220 |
| 5,454,267 A | | 10/1995 | Moreau et al. |

(Continued)

FOREIGN PATENT DOCUMENTS

DE 195 29 782 2/1997

(Continued)

OTHER PUBLICATIONS

Harfang Microtechniques Inc. [online]; [retrieved on Sep. 2006]; retrieved from the internet http://www.harfangmicro.com, Boiler Tube Imaging, 2p, Quebec, Que-Canada.

(Continued)

*Primary Examiner*—J M Saint Surin
(74) *Attorney, Agent, or Firm*—Cantor Colburn LLP

(57) ABSTRACT

A centering apparatus for internal nondestructive testing of a tube to be inspected includes an elongated shaft member coupled to an inspection probe; a plurality of fingers, pivotally attached at a first end thereof to a mounting surface affixed to the shaft member, the plurality of fingers circumferentially surrounding the shaft member; and an expansion mechanism, disposed between the plurality of fingers and the shaft member, the expansion mechanism configured to selectively and outwardly extend a second end of the plurality of fingers with respect to a longitudinal axis of the shaft member, so as to bring the second end of the plurality of fingers into contact with an inner surface of the tube to be inspected, thereby centering the inspection probe within the tube.

26 Claims, 4 Drawing Sheets

U.S. PATENT DOCUMENTS

| | | | |
|---|---|---|---|
| 5,476,010 | A | 12/1995 | Fleming et al. |
| 6,271,670 | B1 | 8/2001 | Caffey |
| 6,282,964 | B1 | 9/2001 | Hancock et al. |
| 6,328,311 | B1* | 12/2001 | Plona et al. ............... 277/355 |
| 6,373,914 | B1 | 4/2002 | Gill et al. |
| 6,502,452 | B1 | 1/2003 | Gill et al. |
| 6,567,795 | B2 | 5/2003 | Alouani et al. |
| 6,799,466 | B2 | 10/2004 | Chinn |
| 6,920,792 | B2 | 7/2005 | Flora et al. |
| 7,543,512 | B2* | 6/2009 | Smith et al. ............... 73/865.8 |
| 7,548,082 | B2* | 6/2009 | Tanioka et al. ............. 324/762 |
| 2003/0188589 | A1 | 10/2003 | Harthorn et al. |

FOREIGN PATENT DOCUMENTS

EP            0 378 480         7/1990

OTHER PUBLICATIONS

Russell NDE Systems Inc., [online]; [retrieved 2007]; retrieved from the internet http://www.russelltech.com/ut/DarisMain.html, 2007, An Innovation in Tube Inspection DARIS,1p, Edmonton, Alberta, Canada.

Wikipedia. [online]; [retrieved on Apr. 13, 2007]; retrieved from the Internet http://en.wikipedia.org/wiki/Internal_Rotary_Inspection_System, Internal rotary inspection system 1p.

NDT, [online]; [retrieved on Apr. 13, 2007]; retrieved from the Internet http://www.ndt.net/apcndt2001/papers/7/7/htm Charles Panos, Condition Monitoring-Process Plant Tube Inspection and Ongoing Commitment by Plant Owners and Operators,10p, International Tube Testing Pty Ltd, Qld, Australia.

PCT International Search Report and The Written Opinion of the International Searching Authority dated Aug. 25, 2008—(PCT/US2008/063500).

* cited by examiner

BOILER TUBE INSPECTION PROBE WITH CENTERING MECHANISM AND METHOD OF OPERATING THE SAME

TECHNICAL FIELD

The present disclosure relates generally to nondestructive inspection systems and, more particularly, to a boiler tube inspection probe having a centering mechanism and a method of operating the same.

BACKGROUND

Boiler tube failures are a major cause of forced shutdowns in fossil fuel power plants. As a result of various operational conditions such as heat, pressure, and wear over time, boiler tubes eventually begin to fail by developing circumferential and axial cracks, as well as experience wall thinning (through both erosion and corrosion). When a boiler tube begins to leak, for example, steam escaping through the leak is lost to the boiler environment. Unless the leak is discovered and repaired, the leak may continue to grow until the tube eventually ruptures, thereby forcing the utility operating the boiler to shut it down immediately. These failures prove to be quite expensive for utilities and, as such, early boiler tube leak detection methods are highly desirable.

To this end, there are several technologies available for nondestructive inspection of structure surfaces, including eddy current, magnetic particle, and dye penetrant techniques. In the case of remote field eddy current inspection, the technique is susceptible to material property variations inherent within a material, thus resulting in signals that can either mask a defect or that can be mistakenly interpreted as a defect. Moreover, existing eddy current techniques cannot quantify and characterize any damage that is found. With respect to magnetic particle and dye penetrant techniques, both involve large amounts of chemicals and are not suited for high speed inspection of boilers due to the time required for chemical application and signal interpretation.

Another non-destructive technique that may be used for boiler tube inspection is ultrasonic testing. In ultrasonic testing, a transducer sends pulse waves into the surface of an object, and receives a return echo indicative of an imperfection. A coupling medium (e.g., liquid) is typically used to provide an effective transfer of ultrasonic wave energy between the transducer and the surface being inspected. In order to conduct an inspection at multiple angles with a single transducer, multiple passes are typically required. Alternatively, phased array ultrasonic sensors utilize a linear or two-dimensional array of ultrasonic transducers that are sequentially pulsed in sequence. Through superposition of individual wavelets, phased arrays provide the capability of steering the angle of the beam. Thus, the beam angle may be set by adjusting the timing of the individual pulses.

Notwithstanding the advantages offered by phased array ultrasonic sensors, tubes used in industrial boilers present a difficult challenge with respect to inspection, as the space surrounding the tubes (and thus access thereto) is typically very limited. In boiler systems, wall-loss is a major concern for small diameter (e.g., 1-2 inch) tubing, where the outside diameter of such tubes is not accessible. As a result, inspection from the inside of these tubes is often required. However, such tubes typically also have small radius bends (e.g., 5-6 inches) and are often swaged (tapered) and the ends thereof. These constraints in tube geometry make it difficult to implement, an effective, full-length inspection of the tubes as existing ultrasonic probes cannot traverse through the extreme bends and swages present therein.

Accordingly, it would be desirable to provide an improved probe for applications such as boiler tube inspection.

SUMMARY

According to aspects illustrated herein, an internal inspection assembly includes an elongated shaft member coupled to an inspection probe and a centering mechanism configured to center the inspection probe with respect to an inside diameter of a tube to be inspected. The centering mechanism further includes a first plurality of fingers, pivotally attached at a first end thereof to a first mounting surface affixed to one end of the shaft member, the first plurality of fingers circumferentially surrounding the shaft member; a second plurality of fingers, pivotally attached at a first end thereof to a second mounting surface affixed to an opposite end of the shaft member such that the inspection probe is disposed between the first and second plurality of fingers, the second plurality of fingers circumferentially surrounding the shaft member; and an expansion mechanism associated with both of the first and second plurality of fingers, the expansion mechanism disposed between the first and second plurality of fingers and the shaft member, the expansion mechanism configured to selectively and outwardly extend a second end of the first and second plurality of fingers with respect to a longitudinal axis of the shaft member, so as to bring second end of the first and second plurality of fingers into contact with an inner surface of the tube to be inspected, thereby centering the inspection probe with respect to the inside diameter of the tube.

According to other aspects illustrated herein, a method of centering an inspection probe within a tube to be inspected includes activating an expansion mechanism, the expansion mechanism disposed between a plurality of fingers and an elongated shaft member coupled to an inspection probe; the plurality of fingers further being pivotally attached at a first end thereof to a mounting surface affixed to the shaft member, the plurality of fingers circumferentially surrounding the shaft member; wherein upon activation, the expansion mechanism outwardly extends a second end of the plurality of fingers with respect to a longitudinal axis of the shaft member, so as to bring the rotatable rollers into contact with an inner surface of the tube to be inspected, thereby centering the inspection probe within the tube.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Disclosed herein is centering mechanism configured to facilitate and maintain accurate centering of a probe (such as an ultrasonic probe, for example) within a tube to be inspected, even where the tube includes bends and swaged sections. Briefly stated, the centering mechanism features a plurality of fingers that are pivotally attached to a mounting surface of a shaft member associated with the probe. The fingers circumferentially surround the shaft member, and include a rotatable roller disposed at the end. An expansion mechanism (such as an inflatable bladder, for example) is disposed between the fingers and the shaft member, and when activated in response to an activation signal (e.g., air, water, liquid or electrical signal), outwardly extends the fingers with respect to a longitudinal axis of the shaft member so as to bring the rotatable rollers into contact with an inner surface of the tube to be inspected, thereby centering the inspection probe within the tube.

As opposed to mechanically rotating ultrasonic sensor devices, such as an Internal Rotary Inspection System (IRIS), the present embodiments avoid the shortcomings of rotating mirror ultrasonics with respect to their unsuitability for negotiating compact, severe bends common in thin, small diameter (e.g., 1.5 inches or less) boiler tubing. Rather, the present centering mechanism embodiments are further compatible with a ring-shaped, phased array transducer that is electronically rotated for steering of beam shape, angle and focal depth.

Figure 1:
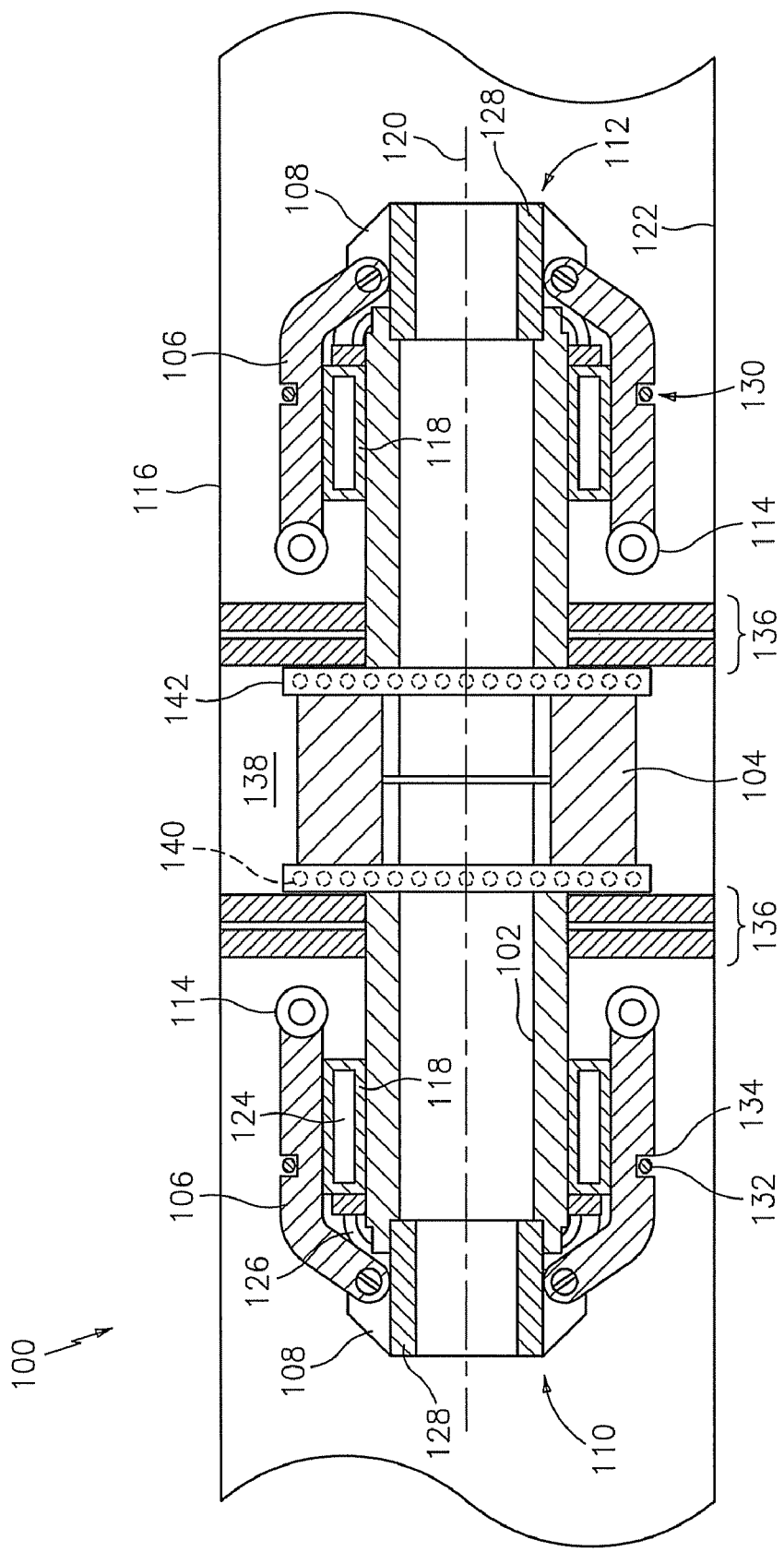
FIG. 1 is a cross-sectional view of a probe centering apparatus in accordance with an exemplary embodiment of the invention.
Figure 2:
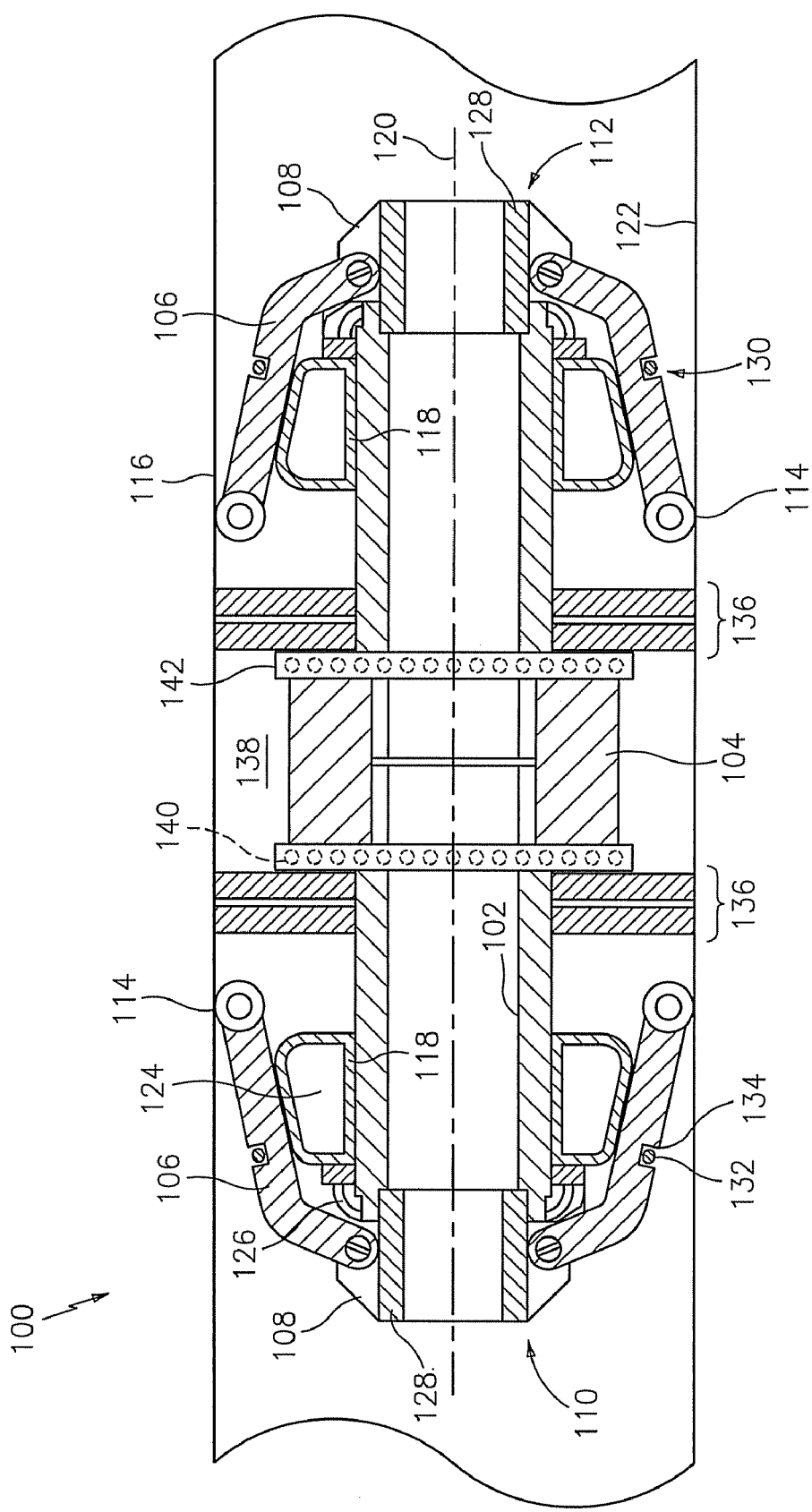
FIG. 2 is another a cross-sectional view of the probe centering apparatus of FIG. 1, with the fingers thereof shown in an expanded position.

Referring initially to FIGS. 1 and 2, there is shown a cross-sectional view of a probe centering apparatus 100 in accordance with an exemplary embodiment of the invention. It should be appreciated at the outset that the exemplary figures shown herein are not necessarily to scale, and it is contemplated that dimensions of the various elements may be modified in accordance with the size and shape of the tubing to be inspected. The centering apparatus 100 includes an elongated shaft member 102 coupled to an inspection probe 104, such as an ultrasonic phased array transducer. A first plurality of fingers 106 is pivotally attached at a first end thereof to a mounting surface 108 affixed to one end 110 of the shaft member 102, while a second plurality of fingers 106 is pivotally attached at a first end thereof to a corresponding mounting surface 108 affixed to an opposite end 112 of the shaft member 102 such that the inspection probe 104 is disposed between the first and second plurality of fingers 106.

Both the first and second plurality of fingers 106 circumferentially surround the shaft member 102. In an exemplary embodiment, there may be 8 individual fingers in each group or plurality of fingers 106, however a greater or lesser number may also be employed. In addition, each finger 106 has a rotatable roller 114 disposed at a second end thereof. Thus configured, the second (roller) end of the first and second plurality of fingers 106 face each other. In one exemplary embodiment, a distance between the second ends of the first and second plurality fingers, in the deactivated state of FIG. 1, may be about 1.5 times the inside diameter of the tube 116 to be inspected.

As will further be seen from FIGS. 1 and 2, an expansion mechanism 118 is disposed between the first and second plurality of fingers 106 and the shaft member 102. Once selectively activated (FIG. 2), the expansion mechanism 118 is configured to outwardly extend the second end of the first and second plurality of fingers 106 with respect to a longitudinal axis 120 of the shaft member 102, so as to bring the rotatable rollers 114 into contact with an inner surface 122 of the tube to be inspected, thereby centering the inspection probe 104 with respect to the inside diameter of the tube 116. In the exemplary embodiment depicted, the expansion mechanism 118 comprises an inflatable bladder or tire, wherein an internal plenum 124 thereof is caused to expand through the application of a pressurized fluid (e.g., air, gas, liquid, etc.) fed through a supply tube 126, as particularly shown in FIG. 2. In this instance, the supply tube 126 may be included within a flexible cable 128 coupled to the shaft member 102. Although not specifically depicted in FIGS. 1 and 2, the flexible cable 128 is also used to house the electrical wiring for the transducer 104 as well as other tubing for transporting an ultrasonic coupling medium (e.g., water) for the ultrasonic signals between the transducer 104 and tube 116. As illustrated later, however, other expansion mechanisms may also be employed in order to outwardly direct the fingers 106 such that the rollers 114 contact the inside surface 122 of the tube 116.

Whenever the expansion mechanism 118 is in a deactivated state, such as shown in FIG. 1, for example, a biasing mechanism 130 inwardly biases the second end of the plurality of fingers 106 toward the longitudinal axis 120 of the shaft member 102. In the embodiment depicted, the biasing mechanism 130 includes an elastic ring 132 wrapped around the first and second plurality of fingers 106, and which sits within corresponding notches 134 defined in the fingers 106. The elastic ring 132 may include structures such as elastic bands, rubber bands, O-rings and the like.

Still referring to FIGS. 1 and 2, the shaft member 102 is further provided with opposing sets of semi-permeable membranes 136 so as to define a chamber 138. The chamber 138 holds the ultrasonic coupling medium (e.g., water) therein as the apparatus 100 is moved through the length of the pipe 116 during ultrasonic inspection thereof. The semi-permeable membranes 136 enclose the coupling medium in a manner which allows for a slight leakage of the medium in order to promote turbulence-free and air bubble free conditions during testing. In an exemplary embodiment, the semi-permeable membranes 136 include a pair of brush seals. The coupling medium may be introduced into the chamber 138 through, for example, a plurality of ports 140 formed in a pair of couplant delivery rings 142.

Figure 3:
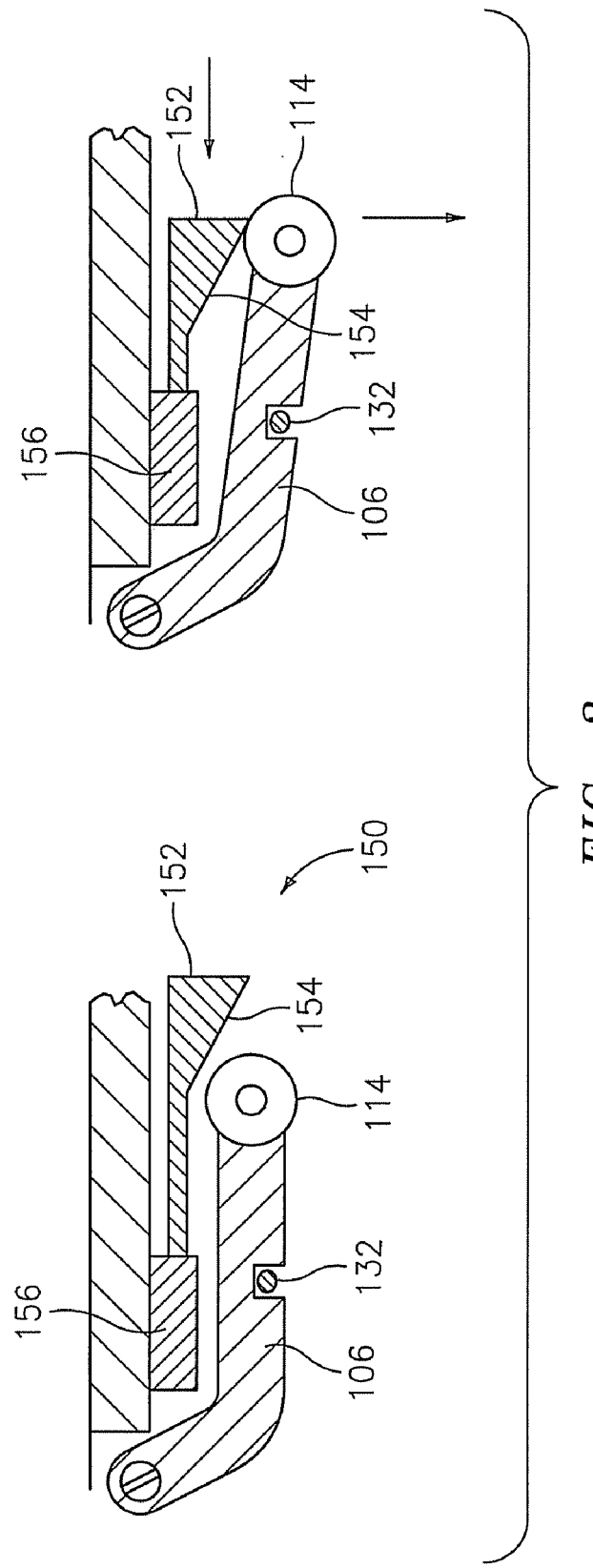
FIG. 3 is a schematic diagram of an alternative expansion mechanism in accordance with another exemplary embodiment of the invention.

Referring now to FIG. 3, there is shown a schematic diagram of an alternative embodiment of an expansion mechanism 150 that may be utilized in conjunction with the fingers 106 of the centering apparatus. As is shown, an actuator 152 includes a sloped or ramped surface 154 in sliding engagement with the rollers 114, for example, of a given finger 106. The actuator 152 is configured for travel in a direction substantially parallel to the longitudinal axis 120 of the shaft member 102 in FIGS. 1 and 2, and may be solenoid activated for example. Thus, by activating a solenoid 156, the actuator 152 is inwardly drawn to a retracted position, causing the roller 114 to ride up and along the sloped surface 154, thereby pivoting the finger 106 and moving the roller 114 in an outward direction. Conversely, by deactivating the solenoid 156, an internal biasing mechanism within the solenoid 156 (e.g., a spring) causes the actuator 152 to return to its original extended position. The finger biasing mechanism (e.g., ring 132) then causes the finger 106 to return to a deactivated state.

Figure 4:
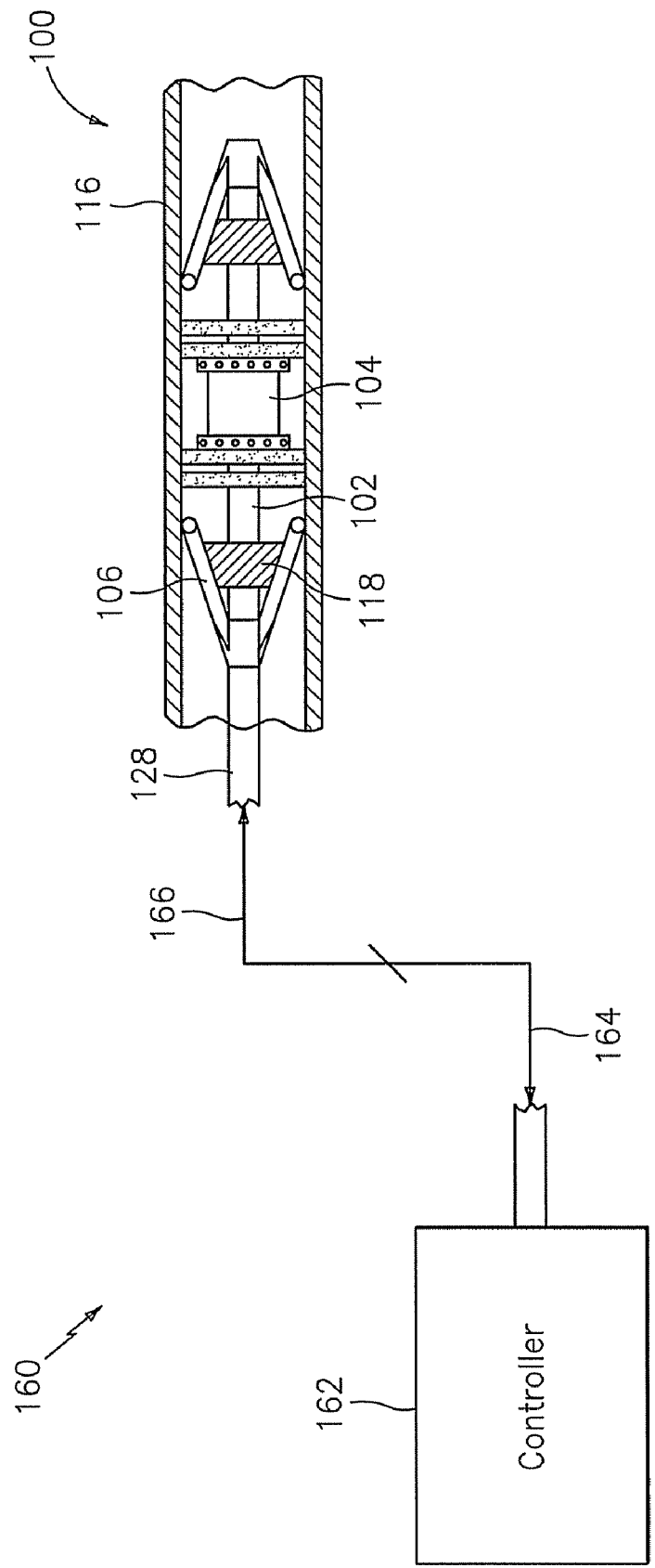
FIG. 4 is a schematic diagram of an exemplary internal inspection system, utilizing the probe centering apparatus of FIGS. 1 and 2.

Referring now to FIG. 4, there is shown a schematic diagram of an exemplary internal inspection system 160, utilizing the probe centering apparatus 100 of FIGS. 1 and 2. A controller 162 is in signal communication with the probe 104, as well as with the expansion mechanism 118 of the probe centering apparatus 100, through a cable 164. The cable 164 may be a multipurpose cable that is capable of carrying electrical wiring and tubing, for example, in order to transmit and receive signals from the probe 104 and centering apparatus. The cable 164 may be the same cable as the flexible cable 128 coupled to the shaft member 102, or may be a separate cable. The expansion mechanism 118 is activated through an external control signal 166 provided by the controller 102. As indicated above, the control signal 166 may be, for example, an air, water, liquid or electrical signal.

Thus configured, the above described probe centering apparatus embodiments provide a flexible inspection tool for internal inspection of thin boiler tubing characterized by bends and swages. In particular, the centering apparatus is compatible with phased ultrasonic testing using a phased array ring transducer that electronically rotates without the use of rotating components such as motors or mirrors. By outwardly extending the fingers of the centering mechanism, the rollers at the ends thereof contact the inner wall of the tube to be inspected, thereby accurately centering the probe within the tube inside diameter for transmission and reflection of an ultrasonic beam.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An internal inspection assembly, comprising:
    an elongated shaft member coupled to an inspection probe; and
    a centering mechanism configured to center the inspection probe with respect to an inside diameter of a tube to be inspected, the centering mechanism further comprising:
        a first plurality of fingers, pivotally attached at a first end thereof to a first mounting surface affixed to one end of the shaft member, the first plurality of fingers circumferentially surrounding the shaft member;
        a second plurality of fingers, pivotally attached at a first end thereof to a second mounting surface affixed to an opposite end of the shaft member such that the inspection probe is disposed between the first and second plurality of fingers, the second plurality of fingers circumferentially surrounding the shaft member; and
        an expansion mechanism associated with both of the first and second plurality of fingers, the expansion mechanism disposed between the first and second plurality of fingers and the shaft member, the expansion mechanism configured to selectively and outwardly extend a second end of the first and second plurality of fingers with respect to a longitudinal axis of the shaft member, so as to bring second end of the first and second plurality of fingers into contact with an inner surface of the tube to be inspected, thereby centering the inspection probe with respect to the inside diameter of the tube.

2. The internal inspection assembly of claim 1, wherein the expansion mechanism comprises an inflatable bladder.

3. The internal inspection assembly of claim 1, further comprising a rotatable roller disposed at the second end of the first and second plurality of fingers, the rotatable rollers configured to contact the inner surface of the tube to be inspected upon activation of the expansion mechanism.

4. The internal inspection assembly of claim 1, further comprising a biasing mechanism configured to inwardly bias the second end of the first and second plurality of fingers toward the longitudinal axis of the shaft member whenever the expansion mechanism is deactivated.

5. The internal inspection assembly of claim 4, wherein the biasing mechanism comprises an elastic ring wrapped around the first and second plurality of fingers.

6. The internal inspection assembly of claim 5, wherein the elastic ring sits within a plurality of notches formed within the plurality of fingers.

7. The internal inspection assembly of claim 1, wherein the second end of the first and second plurality of fingers face each other.

8. An internal inspection assembly, comprising:
    an elongated shaft member coupled to an inspection probe; and
    a centering mechanism configured to center the inspection probe with respect to an inside diameter of a tube to be inspected, the centering mechanism further comprising:
        a first plurality of fingers, pivotally attached at a first end thereof to a first mounting surface affixed to one end of the shaft member, the first plurality of fingers circumferentially surrounding the shaft member;
        a second plurality of fingers, pivotally attached at a first end thereof to a second mounting surface affixed to an opposite end of the shaft member such that the inspection probe is disposed between the first and second plurality of fingers, the second plurality of fingers circumferentially surrounding the shaft member; and
    an expansion mechanism associated with both of the first and second plurality of fingers, the expansion mechanism disposed between the first and second plurality of fingers and the shaft member, the expansion mechanism configured to selectively and outwardly extend a second end of the first and second plurality of fingers with respect to a longitudinal axis of the shaft member, so as to bring second end of the first and second plurality of fingers into contact with an inner surface of the tube to be inspected, thereby centering the inspection probe with respect to the inside diameter of the tube;
    wherein the second end of the first and second plurality of fingers face each other, and wherein a distance between the second end of the first plurality of fingers and the second end of the second plurality of fingers, when the expansion mechanism is a deactivated state, is about 1.5 times the inside diameter of the tube to be inspected.

9. The internal inspection assembly of claim 1, wherein the probe comprises an ultrasonic phased array transducer.

10. The internal inspection assembly of claim 9, wherein the ultrasonic phased array transducer is ring shaped.

11. The internal inspection assembly of claim 1, further comprising a pair of semi-permeable membranes disposed around the shaft member, on opposing sides of the inspection probe, so as to define a chamber which contains an ultrasonic coupling medium therein.

12. The internal inspection assembly of claim 11, wherein the semi-permeable membranes comprise a pair of brush seals.

13. The internal inspection assembly of claim 1, wherein the expansion mechanism comprises a solenoid operated actuator having a sloped surface in sliding contact with a corresponding finger.

14. The internal inspection assembly of claim 1, wherein the expansion mechanism is activated by an externally supplied control signal applied thereto.

15. The internal inspection assembly of claim 14, wherein the control signal comprises one of an air, water, liquid or electrical signal.

16. A method of centering an inspection probe within a tube to be inspected, the method comprising:
- activating an expansion mechanism, the expansion mechanism disposed between a plurality of fingers and an elongated shaft member coupled to an inspection probe;
- the plurality of fingers further being pivotally attached at a first end thereof to a mounting surface affixed to the shaft member, the plurality of fingers circumferentially surrounding the shaft member;
- wherein upon activation, the expansion mechanism outwardly extends a second end of the plurality of fingers with respect to a longitudinal axis of the shaft member, so as to bring rotatable rollers, disposed at the second end of the plurality of fingers, into contact with an inner surface of the tube to be inspected, thereby centering the inspection probe within the tube.

17. The method of claim 16, wherein the expansion mechanism comprises an inflatable bladder.

18. The method of claim 16, wherein a rotatable roller is disposed at the second end of the plurality of fingers, each of the rotatable rollers configured to contact the inner surface of the tube to be inspected upon activation of the expansion mechanism.

19. The method of claim 16, wherein a biasing mechanism inwardly biases the second end of the plurality of fingers toward the longitudinal axis of the shaft member upon deactivating the expansion mechanism.

20. The method of claim 16, wherein the biasing mechanism comprises an elastic ring wrapped around the plurality of fingers.

21. The method of claim 20, wherein the elastic ring sits within a plurality of notches formed within the plurality of fingers.

22. The method of claim 16, wherein the probe comprises an ultrasonic phased array transducer.

23. The method of claim 22, wherein the ultrasonic phased array transducer is ring shaped.

24. The method of claim 16, wherein the expansion mechanism comprises a solenoid operated actuator having a sloped surface in sliding contact with a corresponding finger.

25. The method of claim 16, further comprising activating the expansion mechanism by supplying an external control signal thereto.

26. The method of claim 25, wherein the control signal comprises one of an air, water, liquid or electrical signal.

* * * * *